Patented Apr. 11, 1950

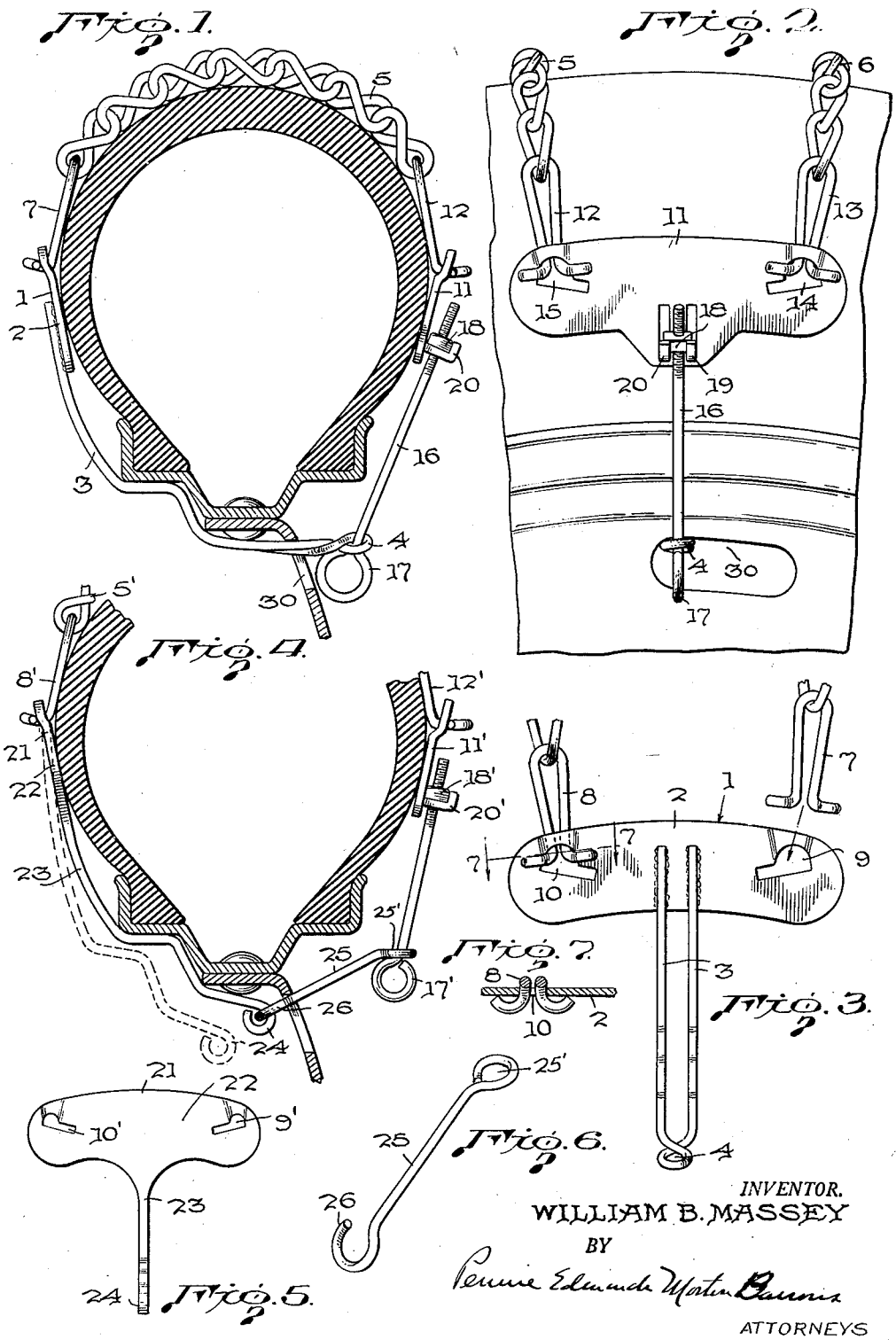

2,504,032

UNITED STATES PATENT OFFICE 2,504,032

ANTISKID DEVICE

William B. Massey, Richmond, Va.

Application August 16, 1947, Serial No. 769,011

7 Claims. (Cl. 152—237)

This invention relates to anti-skid devices for use with a motor vehicle wheel, and specifically to an anti-skid device so constructed that it can easily be mounted on the tire and wheel of an automobile without complicated and tiresome manipulation and without soiling either the appearance or apparel of the person applying the device.

The modern tendency in automobile design has been increasingly toward "streamlining," which in part has come to mean that the body of the car should appear to be close to the ground. Fender construction has fully participated in this trend, as is evident in the growing tendency to build the fenders lower and closer to the tire and wheel and in some cases to extend downwardly beyond the upper part of the tire. This design, however advantageous esthetically, has posed certain practical problems, among them being that it has become increasingly difficult for an operator to apply anti-skid devices to tires quickly and easily and without soiling either himself or his clothing. The reason for this is that anti-skid devices, which are not of the continuous chain construction, usually are applied by putting them around the top part of the tire, which operation requires that the operator put his arm in the space between the tire and the inside of the fender, thereby exposing his hands, cuffs and sleeves to the dirt, oil and grease adhering to the tire and fender. To perform this operation, without soiling the operator or his clothes, is difficult with earlier models, but because of the trend in designing above referred to, it is practically impossible with late model streamlined automobiles, and this problem is particularly complicated by the fact that such devices are very often applied in the midst of very disagreeable weather and surroundings, where under the best of circumstances it would be difficult to avoid becoming soiled.

The anti-skid device of this invention is so constructed and arranged that it may be applied to the tire and wheel of an automobile in such a way that the operator will not have to insert his arm in the space between the tire and fender, and therefore may avoid becoming soiled.

Although prior anti-skid devices have been proposed which it is claimed have solved the problem of mounting the device in such a way that the operator will not become soiled, none, to my knowledge, has accomplished this result without requiring the operator to engage in complicated and laborious manipulation while applying the device.

The anti-skid device of the present invention is also specially designed so that it may be applied to the tire and wheel of an automobile without complicated and laborious manipulation so that it, therefore, overcomes difficulties inherent in prior anti-skid devices and makes practicable an anti-skid device that can be applied easily and quickly without soiling the operator.

The anti-skid device of the present invention comprises a substantially T-shaped metal member, the stem of the T preferably being shaped to conform to a portion of the inboard side of the tire and rim. The end portion of the stem of the T is specially constructed to cooperate with a fastening means when said fastening means is manipulated in the proper manner. A tread portion, which may consist of an anti-skid chain or chains, is detachably connected to the top portion of the T-shaped member by one of its ends and is detachably connected to a plate member by the other of its ends. The fastening means which cooperates with the end of the stem of the T-shaped member has a part which is adapted, when manipulated properly, to engage a part of the plate member specifically designed for this purpose, thus completing the connection between the T-shaped member and the plate member of the device and placing the device, when mounted on a tire, in operating position.

The anti-skid device is so constructed that when initially placed on a tire the plate member hangs freely from the tread portion next to the outboard side of the tire and the T-shaped member hangs freely from the tread portion, but positions itself in a predetermined manner, next to the inboard side of the tire, so that the end of the stem of the T-shaped member is positioned outwardly, appearing at or passing through, depending upon the construction, and opening in the wheel body on which the tire is mounted, where it may be engaged with the fastening means which is then connected to the plate member. The construction and arrangement of the parts causing the T-shaped member to hang in a predetermined manner is one of the salient features of this invention and results in the elimination of complicated and laborious manipulative movements. This positioning is determined largely by the means of connection between the cross-head of the T-shaped member and the tread portion of the device and to a lesser extent by the construction of the T-shaped member.

The stem of the T-shaped member preferably is specially constructed so that it is enabled to fit snugly against the tire and rim, thereby preventing any transverse movement of the anti-skid device around the tire in either direction, thus assuring that the tread portion of the device always will be properly positioned on the tread of the tire when the vehicle on which the anti-skid device is mounted is in motion.

The invention will be exemplified in the following description, but the limits of the invention will be set out in the appended claims.

In the drawings:

Fig. 1 is a transverse sectional view through an automobile tire and a portion of the wheel on which it is mounted, showing my improved anti-skid device attached thereto, Fig. 2 is a right-hand side elevational view of the device shown in Fig. 1, also applied to an automobile tire, Fig. 3 is a detailed view showing the manner of attaching the ends of the anti-skid chains to a portion of the device.

Fig. 4 is a view similar to Fig. 1, showing a modified form of the anti-skid device, Fig. 5 is a front elevational view of one of the securing elements of Fig. 4, Fig. 6 is a perspective view of another of the fastening elements shown in Fig. 4, and Fig. 7 is a detailed sectional view on line 7—7 of Fig. 3.

The anti-skid device of the present invention, as shown in Figs. 1 through 4, comprises a substantially T-shaped metal member 1, having a cross-head 2 and a stem 3 which extends generally out of the plane of the head 2. The stem 3 in some instances may be formed of sheet metal integral with cross-head, but in this form of the invention consists of a length of wire which is bent back on itself at its mid-portion to form two substantially parallel legs, which legs generally are shaped to conform to the contour of the inboard side of the tire and rim. The ends of the legs are permanently attached, by welding or other suitable means, to the lower center portion of the cross-head 2 of the T-shaped member and portions of said legs nearest the looped end are bent toward each other in such a way that an eye 4 is formed in said looped end.

The mass of the T-shaped member 1 is concentrated in the head 2 thereof, and the center of gravity of said T-shaped member is vertical in a plane extending only slightly inwardly of said cross-head. The importance of this construction will be explained in the section of this description dealing with the method of applying the anti-skid device to the tire and wheel of an automobile.

Anti-skid chains 5 and 6, which are of equal length, are detachably connected at one end to the cross-head 2 of the T-shaped member by claw links 7 and 8 attached to the anti-skid chains and passing through longitudinally spaced openings 9 and 10 formed in the cross-head 2. The anti-skid chains 5 and 6 likewise are detachably connected at their other ends to a plate member 11, of generally rectangular shape, by claw links 12 and 13 attached to the anti-skid chains, and passing through longitudinally spaced openings 14 and 15 formed in said plate member 11.

The cross-head of the T-shaped member and the plate member 11 have portions depressed outwardly to provide recesses in which the respective claw links are received. Thus, the inner edges of the respective claw links lie substantially in the planes of the inner surfaces of the cross-head and plate member, so that when the anti-skid device is applied to a vehicle tire there will be no abrading of the side walls thereof by the claw links.

Each of the claw links 7, 8, 12, and 13 is of generally U-shaped construction, having the lower portions of the legs bent outwardly at right angles from the upper portions of the U, so that the bent-out portions are substantially parallel to one another, and then bent around, outwardly and backwardly to form spreaded arcuate portions, the arcuate portions being in a plane containing the bent-out portions, which plane is at right angles to the plane containing the upper portions of the legs of the U.

Each of the openings 9, 10, 14, and 15 through which claw links 7, 8, 12, and 13 respectively pass, comprises two connected slots, one slot extending substantially parallel to the longitudinal top edge of the member in which it is formed, and the other slot extending inwardly and downwardly from the approximate middle of the parallel slot. The openings 9, 10, 14, and 15 each are so dimensioned that the angularly extending slot is of greater length than the parallel slot, for reasons to be explained.

Each of the claw links is of resilient construction and is so dimensioned with respect to the opening through which it passes that the anti-skid chains 5 and 6 may be connected to T-shaped member 1 and plate member 11 by pressing the legs thereof together such that the spreaded arcuate portions can be passed through the angularly extending slot in each opening. While the legs are pressed together the claw link may be passed from the angularly extending slot into the parallel slot and the legs then released from pressure so that they may spring apart and thus contact the edge portions bounding the ends of the parallel slot.

The spreaded arcuate portions of the claw links are so dimensioned with respect to the upwardly-extending legs of the U-shaped portion of the claw links that when the claw links are attached to the cross-head 2 of the T-shaped member, the ends of the arcuate spreaded portions and the legs of the U-shaped portion clamp the cross-head 2 between them, the spreaded arcuate portions pressing against the outer surface of the cross-head adjacent and opposite the opening through which they pass, while the upwardly extending legs press against the opposite, or inner surface of the cross-head at a higher level, so that the combined forces of the spreaded arcuate portions of the links and the upwardly-extending legs tend to cant the T-shaped member so that when it is hung from the anti-skid chains 5 and 6 by the claw links and the anti-skid chains placed on top of a tire the stem 2 of the T-shaped member will be caused to swing outwardly and beneath the tire rim. The construction of the T-shaped member is such as to assist such tendency of the stem to swing to a position beneath the tire rim.

The angular slot of each opening is so dimensioned that when the legs of a claw link are pressed together to their most contracted position, the spreaded arcuate portions readily may pass through it, but the shorter parallel slot is too short to permit the arcuate portions to pass through it, even at the most contracted position of the claw links. This construction insures that the anti-skid chains 5 and 6 will not become disconnected from the T-shaped member and the plate member 11, during operation, because, as will be later explained, when the device is in operating position all the members are under tension, and thus even if, under extraordinary operating conditions, the legs of a claw link were to be forced together, the claw links would hold firm since their spreaded arcuate portions could not pass through the short parallel slot, and, since the anti-skid chains would be pulling on the claw link, the said portions could not pass down into the angularly-extending slot.

Plate member 11 is connected to the stem 3 by fastening means 16 composed of an eye bolt 17 and a nut 18. The eye of the eye bolt 17 is larger than the eye 4 of the stem 2 so that it cannot be pulled therethrough. The eye bolt 17, with the nut 18 partially threaded thereon, passes through eye 4 of the stem 3 and engages behind upstanding claws 19 and 20 formed on plate member 11. These upstanding claws 19 and 20 may be formed in any desired manner, such as by striking from the plate member two spaced tongues which are bent outwardly approximately 90 degrees to the plate member and the upper portions thereof then bent upwardly parallel to the body of the plate member. The claws 19 and 20 are so spaced that the eye bolt 17 will pass readily between them, and the nut 18 is of such size that it rests upon the outwardly-extending portions of the claws and behind their upwardly-extending outer ends.

In mounting the anti-skid device in operating position on the tire and wheel, the operator grasps the plate member 11 with one hand, holding the member approximately in its operating position next to the outboard side of the tire and wheel, and grasps the cross-head 2 of the T-shaped member with the other hand, pointing the stem 3 toward the wheel of the automobile. He then inserts the stem of the T-shaped member in the space between the tire and the fender, positioning said member approximately in the radial plane passing through the center of an opening 30 in the wheel body at or near the top of the wheel. Since the plate member 11 is held in its operating position, the anti-skid chains 5 and 6 are slack when the stem of the T-shaped member enters the space between the wheel and the fender, and the operator then thrusts the T-shaped member upwardly and inwardly, releasing his grasp of the said member so that his arm does not contact the tire or the inside of the fender. The resulting momentum from the thrust will carry the said member over the top of the tire.

Since the plate member 11 has been maintained in its operating position at the outboard side of the tire, the attached anti-skid chains 5 and 6 are positioned approximately in their operating position, and the T-shaped member hangs freely from the inner ends of the anti-skid chains with the cross-head thereof positioned next to the inboard side of the tire. As has been heretofore explained, the center of gravity of the T-shaped member is approximately in the vertical plane of the cross-head 2. Due to that fact and to the construction of the claw links which clamp the top of the T-shaped member in the manner described, the stem 3 will be caused to assume a position in which it extends outwardly beneath the tire rim and passes through the opening in the wheel body.

It may be that in some instances in initially positioning the anti-skid device in a tire the distal end of the stem will not be in alignment with and pass through the opening in the wheel body, but will abut against a portion of the wall bounding the opening 30 in the wheel body. If this should occur it is necessary only to slightly jiggle or whip the plate member, which motion will be transmitted through the chains to the T-shaped member thus jarring the distal end of the stem which then will slip through the opening to its proper position.

The eye bolt 17, with the nut 18 partially threaded thereon, is passed, threaded end first, through the eye 4 of the stem 3 of the T-shaped member so that the eye of the eye bolt abuts against the smaller eye 4 of the stem. The threaded end of the eye bolt is then passed between the upstanding claws 19 and 20 on the plate member 11 to a position where the nut 18 can pass behind the upstanding end portions of the claws and be caused to rest upon the horizontal portions thereof. The eye bolt then may be rotated to thread it farther through the nut, which action will serve to draw the T-shaped member and the plate member 11 closer together thereby drawing the anti-skid device tightly around the tire and wheel. When the proper degree of tightness or tension is obtained by this action, the device is in operating position and ready for use.

In the form of the invention shown in Figs. 4, 5 and 6, the anti-skid device comprises a rigid, metal, substantially T-shaped member 21 having a cross-head 22 from the lower center of which extends a stem 23 of narrow strip-like construction which is formed integrally with said base. The major portion of the stem 23 of the T may be shaped generally to conform to the inboard side of the tire and wheel, while the extreme end portion of the said stem is bent to form an eye 24. The construction of the T-member 21 as regards concentration of mass and center of gravity is the same as in the form of the invention previously described.

Anti-skid chains 5' are detachably connected at their inner ends to the top of the cross-head of the T-shaped member by claw links 8', which are attached to the anti-skid chains and which pass through longitudinally spaced openings 9' and 10' formed in the top of the cross-head. The anti-skid chains likewise are detachably connected at each of their other ends to a plate member 11' of generally rectangular shape by claw links 12', which are attached to the outer ends of the anti-skid chains and which pass through longitudinally spaced openings formed in said plate member, in a manner similar to that in which the claw links 12 and 13 (Fig. 2) pass through openings 14 and 15.

The claw links 8' and 12' are of the same shape and formed in the same manner as the claw links of the first form of the invention and the openings 9' and 10' are formed in the same manner as the corresponding openings of the form of the invention previously described, and both function in the same manner, with the claw links 8' cooperating with the cross-head of the T-shaped member so as to cause said member, when hung from the anti-skid chains, to be further positioned outwardly.

Plate member 11' is connected to the eye 24 of the stem 23 of the T-shaped member by fastening means, which is composed of a hook member 25, an eye bolt 17' and a nut 18'. The hook member 25 is formed of a short length of metal rod, one end of which is bent around and back to form an eye 25' and the other end of which is bent to form a hook 26. The eye of eye bolt 17' is larger than the eye 25' of the hook member 25 to prevent its being pulled therethrough. The hooked end 26 of the hook member 25 engages the eye 24 of the stem 23 of the T-shaped member, and the threaded end of the eye bolt, with the nut partially threaded thereon, is passed through the eye 25' of the hook member 25 and between upstanding claws 20' formed on the plate member, the said upstanding claws being formed in the same manner as the upstanding claws 19 and 20 of the previously described form of the invention.

The operation of this form of the invention generally is similar to that of the form of the invention already described. The operator, while maintaining the plate member 11' in its approximate operating position next to the outboard side of the tire, inserts the T-shaped member between the tire and fender, positioning it approximately in the radial plane passing through the center of an opening in the wheel body at or near the top of the wheel, and thrusts the said member upwardly and inwardly so that the chains lay across the tread of the tire and the T-shaped member hangs on the inboard side of the tire in such predetermined manner that the eye 24 of the said member lies opposite, but does not extend through, the opening in the wheel body. This predetermined positioning is determined by the same factors which caused the prepositioning of the T-shaped member of the above-described form of the invention.

The operator then grasps the hook member 25, and passes the hooked end 26 through the opening in the wheel body and engages the eye 24 of the T-shaped member. While maintaining this engagement, he passes the threaded end of the eye bolt 17' through the eye 25'. The threaded end of the eye bolt 17', with the nut 18' partially threaded thereon, is passed between the upstanding claws 19' and 20' on the plate member 11' to a position where the nut 18 can pass behind the upstanding end portions of the claws and be caused to rest upon the horizontal portions thereof. The eye bolt 17' then may be rotated to thread it farther through the nut 18', thus drawing the T-shaped member 21 and the plate member 11' together and drawing the anti-skid device closer around the tire and wheel to its operating position.

It readily will be seen that the above described anti-skid devices have many advantages, among which are the ease and cleanliness of application. The parts of the invention, particularly the claw links and the members into which they fit, are so designed that they may be easily and cheaply manufactured and assembled without any special machines, may be assembled, in fact, with the aid of only a pair of pliers, or other appropriate tool, to press the legs of the claw links together sufficiently to insert them through the openings in the plate member 11 and the cross-head of the T-shaped member as above described.

Various changes and modifications may be made in the anti-skid device without departing from the scope of this invention.

I claim:

1. An anti-skid device for use with a vehicle wheel having a wheel body, a rim and a tire, comprising a tread portion adapted to lie across the tread of the tire, a T-shaped member having a relatively wide cross-head adapted to be positioned next to the inboard side of the tire and a relatively narrow stem adapted to extend radially inwardly of the wheel and outwardly toward the outboard side of the wheel transversely of the rim, and link means connecting said cross-head to the inboard end of said tread portion, whereby said T-shaped member is hung from said inboard end of said tread portion, said link means having a portion adapted to contact and exert a force against one side of said cross-head and another portion adapted to extend through said cross-head and to contact and exert a force against the other side of said cross-head to thereby clamp said cross-head between said portions of said link means, said forces acting in opposed directions and in offset relation to one another whereby when said T-shaped member hangs from said inboard end of said tread portion, said stem portion is forced toward the outboard side of the wheel to a position to readily be connected to the outboard end of said tread portion.

2. An anti-skid device for use with a vehicle wheel having a wheel body, a rim and a tire, comprising a tread portion adapted to lie across the tread of the tire, a strap member adapted to be connected by one of its ends to the inboard end of said tread portion, a plate member connected to the outboard end of said tread portion and adapted to lie next to the outboard side of the tire, said plate member being provided with a pair of spaced claws having portions substantially perpendicular to said plate member and portions substantially parallel to said plate member, and connecting means adapted to engage the free end of said strap member and to pass between said claws and having a part adapted to rest against the perpendicular portion and lie behind the parallel portions of said claws whereby said connecting means connects the plate member to the free end of said strap member.

3. An anti-skid device for use with a vehicle wheel having a wheel body, a rim and a tire, comprising a tread portion adapted to lie across the tread of the tire, a T-shaped member having a relatively wide cross-head provided with spaced recessed portions adapted to be positioned next to the inboard side of the tire with said recessed portions facing said tire and a relatively narrow stem adapted to extend radially inward and outwardly toward the outboard side of the wheel transversely of the rim, a pair of links connecting said cross-head to the inboard end of said tread portion, whereby said T-shaped member is hung from said inboard end of said tread portion, means for connecting the stem portion to the outboard end of said tread portion, each of said links being of general U-shaped construction having the lower portion of the legs bent outwardly at right angles from the upper portion of the U and then bent around outwardly and backwardly to form spreaded arcuate portions, each of said links being connected to the cross-head through one of the said recessed portions of said cross-head where the upwardly-extending portions of the legs lie within its respective recess to press against the inner surface of the cross-head and the arcuate portions pass through said recesses and press against the outer surface of the cross-head at a lower level from the place where the upwardly-extending legs press to thereby clamp said cross-head between said portions of said link, the inside edges of said upwardly-extending legs lying substantially in a plane of the inner surfaces of the cross-head so that when the anti-skid device is applied to a vehicle tire there will be no abrading of the side walls thereof by the claw links.

4. An anti-skid device for use with a vehicle wheel having a wheel body, a rim and a tire, comprising a tread portion adapted to lie across the tread of the tire, a strap member adapted to be connected by one of its ends to the inboard end of said tread portion and having an eye in its other end, a plate member connected to the outboard end of said tread portion and adapted to lie next to the outboard side of the tire, said plate member being provided with a pair of spaced claws having portions substantially perpendicular to said plate member and portions substantially parallel to said plate member, an eye bolt, the eye of which is larger than the eye in the strap member, said eye bolt being adapted to be passed, threaded end first, through the eye of the strap member so that its eye abuts the eye of the strap member, and a nut adapted to be threaded on said eye bolt, the threaded end of said eye bolt being of such size as to readily pass between said pair of claws and said nut being of such size as not to pass between said claws, whereby when the anti-skid device is applied to a tire and wheel, the threaded end of said eye bolt with the nut partially threaded thereon can be passed through the eye in said strap member and manipulated in a manner such that the nut threaded thereon passes over the parallel portion of said claws down and behind said parallel portions to rest on said perpendicular portions whereby the anti-skid device may then be properly tightened around the tire and wheel by turning the eye bolt to thread the nut further thereon to draw the plate member closer to the eye of said strap member.

5. An anti-skid device for use with a vehicle wheel having a wheel body, a rim, and a tire, comprising a tread portion consisting of at least two anti-skid chains and adapted to lie across the tread of the tire, a T-shaped member having a relatively wide cross-head provided with spaced recessed portions and a relatively narrow integral stem adapted to extend radially inward and outwardly toward the outboard side of the wheel transversely of the rim and having an eye in its end remote from said cross-head, said cross-head adapted to be positioned next to the inboard side of the tire with the recessed portions facing said tire, a pair of links for connecting said cross head to the inboard end of said tread portion adapting said T-shaped member to be hung from said inboard end of said tread portion, each of said links being of general U-shaped construction having the lower portion of the legs bent outwardly at right angles from the upper portion of the U and then bent around outwardly and backwardly to form spreaded arcuate portions, each of said links being adapted to be connected to the cross-head through one of the said recessed portions of said cross-head where the upwardly-extending portions of the legs lie within its respective recess to press against the inner surface of the cross-head and the arcuate portions pass through said recesses and press against the outer surface of the cross-head at a lower level from the place where the upwardly-extending legs press to thereby clamp said cross-head between said portions of said link, the inside edges of said upwardly-extending legs lying substantially in a plane of the inner surfaces of the cross-head so that when the anti-skid device is applied to a vehicle tire there will be no abrading of the side walls thereof by the claw links, a plate member connected to the outboard end of said tread portion and adapted to lie next the outboard side of the tire, said plate member being provided with a pair of spaced claws having portions substantially perpendicular to said plate member and portions substantially parallel to said plate member, an eye bolt, the eye of which is larger than the eye in the strap member, said eye bolt being adapted to be passed, threaded end first, through the eye of the strap member so that its eye abuts the eye of the strap member, and a nut adapted to be threaded on said eye bolt, the threaded end of said eye bolt being of such size as readily to pass between said pair of claws and said nut being of such size as not to pass between said claws, whereby when the anti-skid device is applied to a tire and wheel, the threaded end of said eye bolt with the nut partially threaded thereon can be passed through the eye in said strap member and manipulated in a manner such that the nut threaded thereon passes over the parallel portion of said claws down and behind said parallel portions to rest on said perpendicular portions whereby the anti-skid device may then be properly tightened around the tire and wheel by turning the eye bolt to thread the nut further thereon to draw the plate member closer to the eye of said strap member.

6. An anti-skid device for use with a vehicle wheel having a wheel body, a rim and a tire, comprising a tread portion adapted to lie across the tread of the tire, and a T-shaped member having a relatively wide cross-head connected to the inboard end of said tread portion and adapted to be positioned next to the inboard side of the tire and a relatively narrow integral stem, the center of gravity of said T-shaped member being approximately in a vertical plane extending through the cross-head thereof and substantially parallel to the side of the wheel when the T-shaped member hangs from the inboard end of said tread portion, and the stem of said T-shaped member being curved in a direction such that when said tread portion is placed across the tread of a tire with the T-shaped member hanging from the inboard end of said tread portion the distal end portion of said stem extends toward the outboard side of the wheel and is positioned radially inwardly of and opposite the wheel rim.

7. An anti-skid device for use with a vehicle wheel having a wheel body, a rim and a tire, comprising a tread portion adapted to lie across the tread of the tire, and a T-shaped member having a relatively wide cross-head connected to the inboard end of said tread portion and adapted to be positioned next to the inboard side of the tire and a relatively narrow integral stem, the stem of said T-shaped member being curved in a direction such that when said tread portion is placed across the tread of a tire with the T-shaped member hanging from the inboard end of said tread portion the distal end portion of said stem extends toward the outboard side of the wheel and terminates just inwardly of the outboard side of the wheel body.

WILLIAM B. MASSEY.

REFERENCES CITED

The following references are of record in the file of this patent:

UNITED STATES PATENTS

| Number | Name | Date |
| --- | --- | --- |
| 2,069,979 | Stahl | Feb. 9, 1937 |
| 2,346,298 | Gulesian | Apr. 11, 1944 |
| 2,420,804 | Wenzel | May 20, 1947 |
| 2,453,426 | Freed | Nov. 9, 1948 |